(12) United States Patent
Padhi et al.

(10) Patent No.: US 7,563,971 B2
(45) Date of Patent: Jul. 21, 2009

(54) ENERGY-BASED AUDIO PATTERN RECOGNITION WITH WEIGHTING OF ENERGY MATCHES

(75) Inventors: Kabi Prakash Padhi, Singapore (SG); Sapna George, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 931 days.

(21) Appl. No.: 10/955,959

(22) Filed: Sep. 30, 2004

(65) Prior Publication Data

US 2005/0273328 A1 Dec. 8, 2005

Related U.S. Application Data

(60) Provisional application No. 60/576,401, filed on Jun. 2, 2004, provisional application No. 60/584,791, filed on Jun. 30, 2004.

(51) Int. Cl.
G10H 1/00 (2006.01)
(52) U.S. Cl. .......................................... 84/600; 700/94
(58) Field of Classification Search ........... 84/600–602; 700/94
See application file for complete search history.

(56) References Cited

U.S. PATENT DOCUMENTS

| | | | | |
|---|---|---|---|---|
| 6,201,176 B1* | 3/2001 | Yourlo | ........................ | 84/609 |
| 7,277,766 B1* | 10/2007 | Khan et al. | ................... | 700/94 |
| 7,295,977 B2* | 11/2007 | Whitman et al. | ............. | 704/236 |
| 7,323,629 B2* | 1/2008 | Somani et al. | ............. | 84/470 R |
| 7,381,883 B2* | 6/2008 | Weare et al. | .................. | 84/668 |
| 7,396,990 B2* | 7/2008 | Lu et al. | ........................ | 84/611 |
| 2002/0002899 A1* | 1/2002 | Gjerdingen et al. | ........... | 84/667 |
| 2002/0005110 A1* | 1/2002 | Pachet et al. | .................. | 84/635 |
| 2002/0037083 A1* | 3/2002 | Weare et al. | .................. | 381/58 |
| 2002/0172372 A1* | 11/2002 | Tagawa et al. | ................ | 381/56 |
| 2002/0178012 A1* | 11/2002 | Wang et al. | ................. | 704/503 |
| 2002/0181711 A1* | 12/2002 | Logan et al. | ................... | 381/1 |
| 2003/0040904 A1* | 2/2003 | Whitman et al. | ............ | 704/212 |
| 2003/0179820 A1* | 9/2003 | Bombard | .................... | 375/224 |
| 2003/0205124 A1* | 11/2003 | Foote et al. | ................... | 84/608 |
| 2003/0221544 A1* | 12/2003 | Weissflog | .................... | 84/667 |
| 2004/0060426 A1* | 4/2004 | Weare et al. | .................. | 84/668 |
| 2004/0094019 A1* | 5/2004 | Herre et al. | .................... | 84/611 |
| 2004/0181401 A1* | 9/2004 | Pachet et al. | ................ | 704/223 |
| 2004/0215447 A1* | 10/2004 | Sundareson | .............. | 704/200.1 |
| 2004/0231498 A1* | 11/2004 | Li et al. | ......................... | 84/634 |
| 2005/0065781 A1* | 3/2005 | Tell et al. | ..................... | 704/203 |
| 2005/0092165 A1* | 5/2005 | Weare et al. | .................. | 84/668 |

(Continued)

*Primary Examiner*—David S. Warren
(74) *Attorney, Agent, or Firm*—Lisa K. Jorgenson; William A. Munck

(57) ABSTRACT

An energy-based pattern recognition algorithm receives the input frames of an audio signal and a test frame sequence and returns a best match in the audio signal to the given test frame sequence. The energy of each input frame is computed and input frames for which the energy is both within a predetermined degree of closeness to the local maximum energy within the test frame sequence and a local maximum within a respective neighborhood of adjacent frames are identified as probable matches. The difference between overall energy for frames neighboring the remaining probable matches and the test frame sequence is computed as a percentage. The best match is selected based on a weighted combination of difference between local maximum energies and minimum percent deviation in overall energy. Local signal characteristic matching may be employed, with weighting, to refine matching.

18 Claims, 4 Drawing Sheets

U.S. PATENT DOCUMENTS

| | | | |
|---|---|---|---|
| 2005/0204904 A1* | 9/2005 | Lengeling et al. | 84/668 |
| 2005/0211072 A1* | 9/2005 | Lu et al. | 84/612 |
| 2005/0217461 A1* | 10/2005 | Wang | 84/608 |
| 2005/0241465 A1* | 11/2005 | Goto | 84/616 |
| 2005/0273326 A1* | 12/2005 | Padhi et al. | 704/231 |
| 2006/0048634 A1* | 3/2006 | Lu et al. | 84/612 |
| 2006/0054007 A1* | 3/2006 | Lu et al. | 84/611 |
| 2006/0060067 A1* | 3/2006 | Lu et al. | 84/612 |
| 2006/0173692 A1* | 8/2006 | Rao et al. | 704/503 |
| 2006/0217828 A1* | 9/2006 | Hicken | 700/94 |
| 2006/0272485 A1* | 12/2006 | Lengeling et al. | 84/611 |
| 2006/0288849 A1* | 12/2006 | Peeters | 84/616 |
| 2007/0162436 A1* | 7/2007 | Sehgal | 707/4 |
| 2007/0282935 A1* | 12/2007 | Khan et al. | 708/270 |

* cited by examiner

FIG. 1
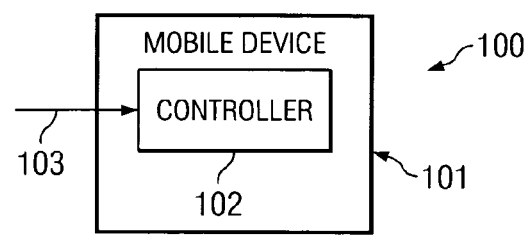
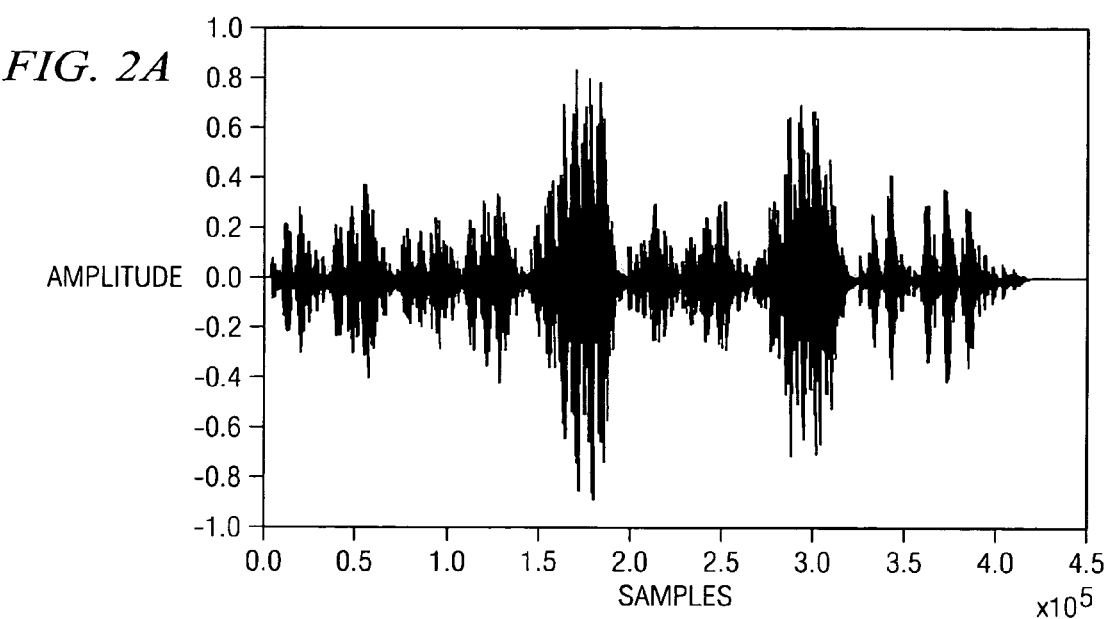
FIG. 2A
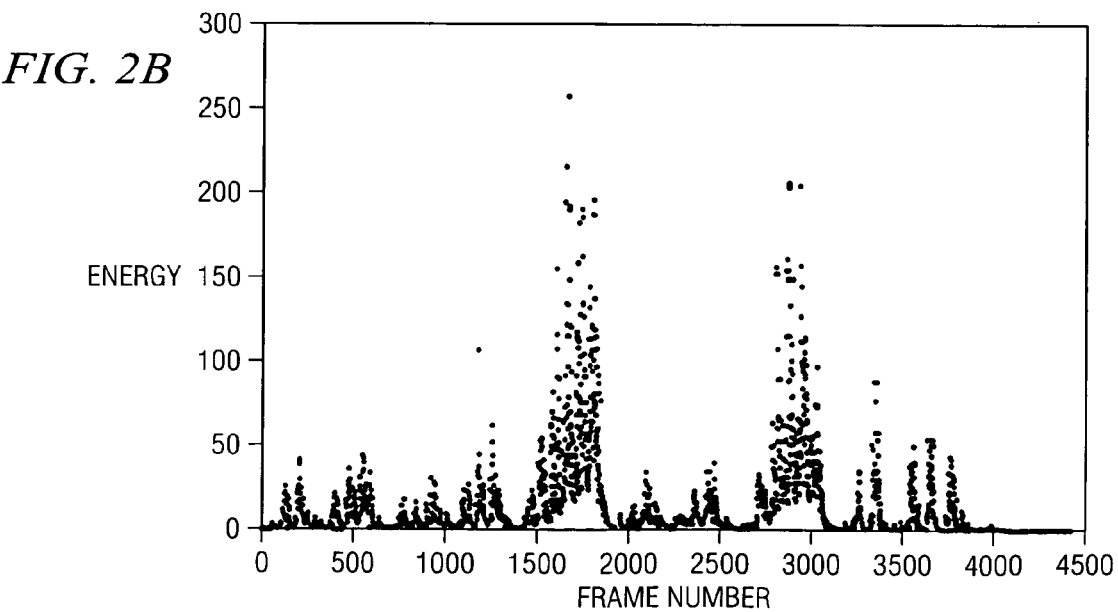
FIG. 2B

ENERGY-BASED AUDIO PATTERN RECOGNITION WITH WEIGHTING OF ENERGY MATCHES

CROSS-REFERENCE TO RELATED APPLICATIONS

This application claims priority to U.S. Provisional Patent Applications Ser. Nos. 60/576,401 filed Jun. 2, 2004 and 60/584,791 filed Jun. 30, 2004.

TECHNICAL FIELD OF THE INVENTION

The present invention is directed, in general, to pattern recognition and, more specifically, to energy-based pattern recognition in audio signals.

BACKGROUND OF THE INVENTION

Automated classification or description of patterns is a challenging task. Standard pattern recognition techniques typically include a transducer converting images, sounds or other physical inputs into signal data, segmentation isolating desired data within the signal data, and feature extraction measuring properties of the signal data useful for classification and employed to assign the signal data to a particular category. Optional post-processing may take other factors into account, such as the cost of an erroneous classification, and decides upon appropriate action. Some systems employ feedback to improve overall classification accuracy.

The most widely utilized pattern recognition techniques are based on the Bayes Theorem, a fundamental theory of inverse probability stated mathematically in equation (1) below:

$$p(A_j \mid B) = \frac{p(B \mid A_j) \cdot p(A_j)}{\sum_j p(B \mid A_j) \cdot p(A_j)} \quad (1)$$

The Bayes Theorem postulates that, for a given event B that has occurred, the probability that event B was due to a cause $A_j$ is equal to the probability that cause $A_j$ should produce the event B times the probability that cause $A_j$ should occur at all, all divided by a scaling factor equal to the sum of such terms for all j possible causes. Adapting this theorem to pattern recognition in audio signals involves computing all probabilities of a given frame occurring given the set of preceding frames.

Standard generic pattern recognition algorithms are highly computationally intensive in nature due to the high data volumes required to train them and the number of probabilities that need to be computed for each test case. In addition, such algorithms do not take into account the specific characteristics of audio signals.

There is, therefore, a need in the art for computationally simple techniques of determining whether a frame from a given audio signal is similar to a test frame.

SUMMARY OF THE INVENTION

To address the above-discussed deficiencies of the prior art, it is a primary object of the present invention to provide, for use in an audio pattern recognition system, an energy-based pattern recognition algorithm receiving the input frames of an audio signal and a test frame sequence and returning a best match in the audio signal to the given test frame sequence. The energy of each input frame is computed, and input frames for which the energy is both within a predetermined degree of closeness to the local maximum energy within the test frame sequence and a local maximum within a respective neighborhood of adjacent frames are identified as probable matches. The difference between overall energy for frames neighboring the remaining probable matches and the test frame sequence is computed as a percentage. The best match is selected based on a weighted combination of difference between local maximum energies and minimum percent deviation in overall energy. Local signal characteristic matching may be employed, with weighting, to refine matching.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise", as well as derivatives thereof, mean inclusion without limitation; the term "or" is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1 is a high level diagram of a system implementing pattern recognition through frame energy-based criteria according to one embodiment of the present invention;

FIGS. 2A through 2C illustrate the correlation of energy to beat in the audio signals for music that is exploited by the pattern recognition system according to one embodiment of the present invention;

DETAILED DESCRIPTION OF THE INVENTION

Figure 3:
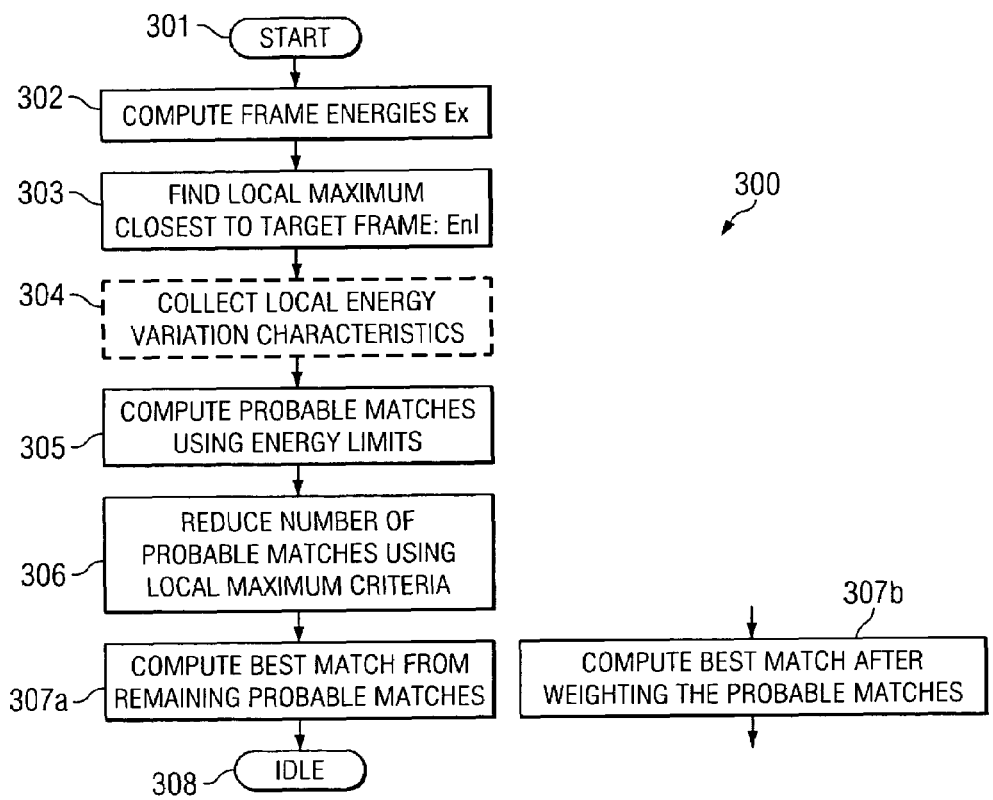
FIG. 3 is a high level flowchart of a process for pattern recognition according to one embodiment of the present invention.

FIGS. 1 through 4B, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 is a high level diagram of a system implementing pattern recognition through frame energy-based criteria according to one embodiment of the present invention. System 100 in the exemplary embodiment includes a mobile device 101, which may be a mobile telephone, a mobile music (e.g., MP3) player, or the like. With mobile device 100, a controller 101 receives audio signals from an input 102. Those skilled in the art will recognize that the complete structure and operation of a pattern recognition system is not depicted or described herein. Instead, for simplicity and clarity, only so much of a pattern recognition system and is unique to the present invention or necessary for an understanding of the present invention is depicted and described.

In the exemplary embodiment of the present invention, pattern recognition system 100 operates on audio signals to recognize musical genre based on their rhythmic nature. However, those skilled in the art will recognize that use of frame energy-based criteria will find application in many fields, including adaptive signal processing, artificial intelligence, neural modeling, optimization/estimation theory, automata theory, fuzzy sets, and structural modeling, including specific processes such as image pre-processing/segmentation, computer vision, seismic analysis, radar signal classification/analysis, face recognition, fingerprint identification, character recognition, handwriting analysis, electrocardiograph signal analysis, and medical diagnosis. The exemplary embodiment is accordingly not meant to be limiting.

The frame energy-based pattern recognition algorithm of the present invention classifies musical works based on their rhythmic nature. Most composed musical works have alliterations—that is, repetition of the same sound or sound pattern after a certain period of time. "Rhythm" covers everything pertaining to the time aspect of music, as distinct from pitch. Accordingly, rhythm includes beats, accents, measures, groupings of notes into beats, grouping of beats into measures, grouping of measures into phrases, etc.

When treated judiciously by the performer with due regularity but artistic purpose, and not mere machine-like accuracy; all of the above-described rhythm factors cause the listener to feel (and say) that the performer has a sense or rhythm, whether "free" or "strict" rhythm. The human ear seems to demand perceptible presence of a time unit (the beat) even in the "free" rhythm of plain songs where grouping into measures is not present. Beats generally fall into regular groups of two or three, or of some combination thereof. Such groups or combinations of groups are indicated by the drawing of bar lines at regular intervals, dividing the music into measures (or "bars") The measures, in turn, can be felt to aggregate into larger groups, or "phrases".

TABLE I below illustrates typical note duration for various genres of music, with a single beat considered as a quarter note and the minimum duration of a note computed using the maximum number of beats per minute (BPM). The $32^{nd}$ note, also known as a demisemiquaver, takes $\frac{1}{8}^{th}$ the time required to play a quarter note and is therefor the shortest possible musical duration considered. Similarly, the $16^{th}$ note (semiquaver) and the $8^{th}$ note 9quaver) take $\frac{1}{4}^{th}$ and $\frac{1}{2}$ the time required to play a quarter note.

TABLE I

| Genre/Style | Min BPM | Max BPM | Min Duration of $32^{nd}$ note (mlliseconds) |
|---|---|---|---|
| Pop | 100 | 125 | 60.00 |
| Techno/Euro | 128 | 138 | 54.35 |
| 70s Funk | 93 | 117 | 64.10 |
| House/Garage | 118 | 128 | 58.59 |
| Hip Hop/Rap | 93 | 115 | 65.22 |
| New Jack Swing/ US Dance | 98 | 113 | 66.37 |
| Street Soul | 92 | 111 | 67.56 |
| Rave/Hardcore | 128 | 140 | 53.57 |

The energy variation of the audio signal for music is a good indication of the underlying rhythmic nature. Though the traditional organization of rhythm has given way to organizations that are much more elaborate, irregular and/or surprising in modern genres, the underlying concept of beats still persists. The exemplary embodiment of the present invention makes use of this rhythmic behavior—both in the energy level of frames and the variation of energy across frames—to determine the best possible match to a given frame of music.

FIGS. 2A through 2C illustrate the correlation of energy to beat in the audio signals for music that is exploited by the pattern recognition system according to one embodiment of the present invention. FIG. 2A is a time domain plot of a portion of Brahms' piano composition "Waltz No. 15 in A Flat", with time represented by sample number and each frame consisting of 2048 samples; FIG. 2B is a plot of the energy distribution as a function of time for the same portion of that work; and FIG. 2C is the score for that portion of the work. As shown by the energy distribution, most beats are in groups of two or three. Frames in the general neighborhood of frame number 250 are similar to frames in the neighborhood of frame numbers 500 and 1250, and the patterns are distinctly repetitive, as reinforced by the score, which confirms that certain sections of the composition are repeated during a performance.

Energy pattern detection requires determination of extrema. However, for a given function f(x), determination of whether the function is increasing or decreasing within a given interval by inspection is not possible. Finding extrema values through substitution is tedious and imprecise, while a graph only returns an approximation for locations and values of maxima and minima. Using the first derivative of the function f(x), on the other hand, the slope of the function can be determined by the following rules: If f(x) is continuous on an interval I and differentiable on the interior of the interval I; then if f'(x)>0 for all x ∈ I, then f(x) is increasing on I; but if f'(x)<0 for all x ∈ I, then f(x) is decreasing on I. By the first derivative test, relative extrema occur where f'(x) changes sign—that is, relative extrema of f(x) occur at critical points of the function f, or values $x_0$ for which either $f'(x_0)=0$ or $f'(x_0)$ is undefined. Moreover, according to the extreme value theory, if a function is continuous on a closed interval, then the function achieves both an absolute maximum and an absolute minimum on the interval. Also, if f(x) has an extreme value on a closed interval, then the extreme value occurs either at a critical point or at an endpoint. These principles of the first derivative are used in the present invention to compute local energy variations.

FIG. 3 is a high level flowchart of a process for pattern recognition according to one embodiment of the present invention. The process 300, which is executed by the controller 102 within the pattern recognition system, is given the inputs of an audio signal and a test frame from within the signal, returning the best match within a remainder of the audio signal to the given test frame. Once the process 300 is initiated (step 301), the energy Ex of each frame x is computed and stored (step 302).

The local maximum energy Enl closest to the test frame energy level is then calculated (step 303), and test frame energy characteristics, specifically local energy variation, are then optionally computed and collected (step 304). The frames in the audio signal whose energy is close to that of the local maximum energy are then isolated as probable matches (step 305). The number of probable matches to the test local maximum is reduced by checking if the maxima are a local maximum within a corresponding neighborhood (step 306).

Finally, the energy difference between the frames neighboring the probable matches and the frames neighboring the test local maximum is computed as a percentage. The best match is then computed either as the probable match with the minimum percent deviation in energy from the test case (step 307a) or the energy deviation of the probable matches from the test case and the local energy variation of the probable matches are weighted for use in selection of the best overall pattern match among the probable matches to the given test audio frame (step 307b). The process then becomes idle (step 308) until search for another match is initiated.

As previously discussed, the energy variation of an audio signal across frames and the energy levels in the frames are used as an estimate of variation in rhythm within the audio signal. For the purposes of illustration, frame 150 in the Brahms composition discussed above is selected as the test pattern whose match is to be found within the remainder of the audio signal.

The maximum energy nearest to the test frame is identified and, once the local maximum in the energy has been isolated, the frames having similar energy levels are identified as probable matches. In the exemplary embodiment, the total number of probable matches (from the data in FIG. 2B) is 57, a very high number that needs to be further reduced. Such reduction is achieved by using the local maximum criteria, which reduces the number of probable matches to 3. The probable match among the three with neighboring energies that differ less from the neighboring energies of the original local maximum initially identified is the best local match.

Figure 4A:
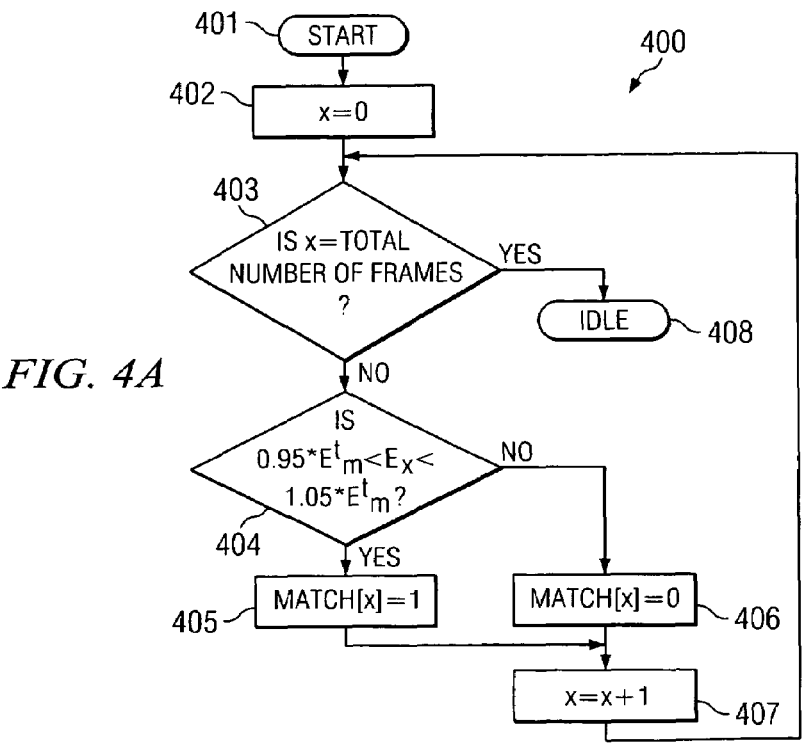
FIGS. 4A and 4B are high level flowcharts illustrating portions of a specific implementation of a pattern recognition process according to one embodiment of the present invention.
Figure 4B:
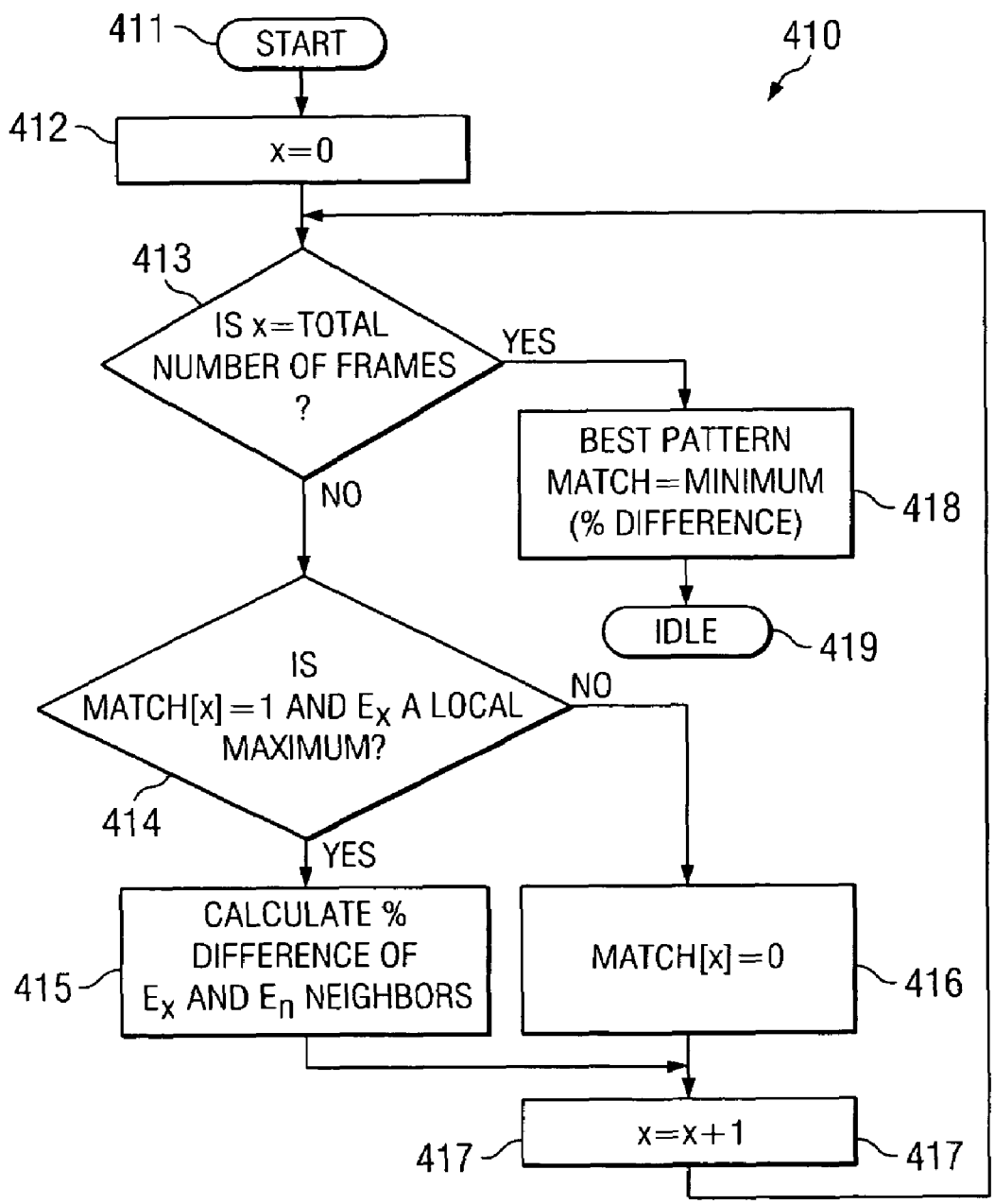

FIGS. 4A and 4B are high level flowcharts illustrating portions of a specific implementation of a pattern recognition process according to one embodiment of the present invention. As with process 300, process portions 400 and 410 are executed by the controller 102 within the pattern recognition system.

The pattern recognition algorithm of the present invention requires a music signal and a test frame from within the music signal, with the best match to the test frame from the remainder of the music signal to be identified. The algorithm can handle pulse code modulated (PCM) signals, a standard format of coded audio signals as an input, where the input is preferably of digital versatile disk (DVD) quality (that is, sampled at 48,000 samples per second).

Because variations in the energy levels of audio signals indicate the rhythmic nature, the short-term energy in a signal x(n) within a specific duration in time is defined as:

$$E^l = \sum_{n=(l-1) \cdot N+1}^{l \cdot N} x(n)^2 \quad (2)$$

where the energy in the $l^{th}$ analysis frame of size N is $E^l$ (and the energy of the test frame is denoted $E^t$). The energy of each frame within the sample is extracted and used by the pattern recognition algorithm.

It is critical to choose an appropriate frame size N, since a larger frame would lead to loss of detection of the onset of beats, and thus a reduction in the accuracy of the algorithm. On the other hand, a smaller frame size leads to a higher number of computations, losing the benefit of computational reduction for the algorithm. In the exemplary embodiment, a standard value of N=1028 samples is assigned, with no overlap between successive frames, corresponding to a duration of 21.3 milliseconds (ms) in time. This provides sufficient resolution to capture the temporal variation of the input signal, being smaller than the minimum duration between notes in a variety of common audio signals as tabulated in TABLE I above.

As musical audio signals are made up of beats, an increase in the energy level always occurs at the onset of a beat. Therefore, for a given test frame with energy $E^t$, the frame with the maximum energy $E_m^t$ in the neighborhood of the test frame is identified by simply comparing the energies of a particular frame l (in this case, the test frame) with immediately adjacent or neighboring frames within a range of 20 frames on either side (that is, $E^l > E^{l \pm 20}$. The difference in the frame numbers between the local maximum and the test frame is then stored:

$$fr\_diff = \text{frame number}(E_m^t) - \text{frame number}(E^t). \quad (3)$$

In addition to selection of frame size as discussed above, a further condition for finding a more accurate match to the test frame is (optional) use of local signal characteristics computed based on the first derivative principles discussed above. Though based on continuous signals, the principles can be extrapolated to encompass discrete frame energies. The following pseudo-code stores the local energy variation characteristics of the signal near the test frame:

```
if (E^(t-1) > E^(t-2))
{
    criteria[2] = 1; /* increasing */
}
else
{
    criteria[2] = 0; /* decreasing */
}
if (E^(t+1) > E^(t+2))
{
    criteria[3] = 0; /* decreasing */
}
else
{
    criteria[3] = 1; /* increasing */
}
``` where criteria[2] and criteria[3] are flags storing the energy characteristics of the audio signal before and after the test frame, respectively. A value of 1 indicates that the energies are monotonically increasing and a value of 0 in the flag indicates that the energies are monotonically decreasing in the respective limits. If both criteria[2] and criteria[3] are 0, the test frame is a local maximum.

The preliminary search for matching frames or matching frames is done using the energy criteria using the decision algorithm 400 depicted in FIG. 4A. The search is initiated (step 401), with the value of a counter x being set to 0 (step 402) and the frames examined stepwise (step 407) until the last frame has been examined (step 403). If the energy $E^x$ of frame x is within ±5% of the energy $E_m^t$ of the local maximum close to the test frame (step 404), frame x is identified as a probable match.

Relaxing the energy criteria (e.g., ±10%) leads to a higher number of probable matches. An array match[x] stores the results of the preliminary pattern search (steps 405 and 406), with a logical 1 indicating a probable match to the local maximum. Once all frames have been examined, and all probable matches identified, the process becomes idle (step 408).

If energy $E_m^t$ is the local maximum close to the test frame t, any matching frame should also be a local maximum for an accurate match. Algorithm 0410 depicted in FIG. 4B is employed for this purpose, with the match[x] flag being reset to a logical 0 for frame x (step 416) if the energy of the frame is not a local maximum. As with algorithm 400, when the search is initiated (step 411), the value of counter x is set to 0 (step 412) and the frames are examined stepwise (step 417) until the last frame has been examined (step 413). The determination of whether the frame energy $E^x$ is a local maximum is accomplished in the manner described above.

For probable matches for which the frame energy $E^x$ is also a local maximum (step 414), the best match to the frames near the test frame needs to be computed. The percent energy difference is computed (step 415) between (a) each candidate match frame $l_m$, determined based on the frame number l of the local maximum candidate probable match frame and the frame difference parameter fr_diff computed in equation (3), and the twenty neighboring frames on either side of that frame and (b) the test frame t and the twenty neighboring frames on either side of the test frame:

$$\% \ diff \ [l_m] = abs\left(\frac{\sum_{n=t-20}^{t+20} E_n - \sum_{n=l_m-20}^{l_m+20} E_n}{\sum_{n=t-20}^{t+20} E_n}\right) \times 100. \quad (4)$$

The (offset) probable match frame $l_m$ for which the minimum percent difference is computed using equation (4) is identified as the best probable match to the test frame (step 418). This condition ensures that the rhythmic pattern of the best match is similar to the rhythmic pattern of the target frame. Once all probable matches have been examined and best probable match identified, the process becomes idle (step 419).

In one embodiment of the present invention, local signal characteristics of candidate probable matches are evaluated by comparing the criteria[2] and criteria[3] flags defined above for the offset probable match frame $l_m$ with the criteria [2] and criteria[3] flags for the test frame t. For a good match, the flags will have the same values for both frames. By taking into account local signal characteristics, any increase in mismatch due to increase or decrease in the loudness (volume) of the audio signal may be negated.

The various criteria for matching the energies of probable matches and the test frame or for comparing the local energy characteristics may optionally be assigned weights for computing the best match to the test frame. In the exemplary embodiment, both energy criteria (energy within ±5% of local maximum energy $E_m^t$ near test frame, and percent difference in energy between test frame/neighboring frames and offset probable match frame/neighboring frames) is each assigned weights totaling 5. On a scale of 0 to 5, a larger percent difference as evaluated in equation (4) receives a lower importance; or, conversely, a smaller maximum energy difference leads to a score closer to 5, indicating a higher degree of match. Any energy difference above 100% is assigned a weight of 0:

$$\text{weighted match} = \frac{5}{100}(100 - \% \ diff) = 0.05 \cdot (100 - \% \ diff). \quad (5)$$

Similarly, if both the criteria[a] and criteria[3] flags are the same for the test frame and the offset probable match, a weight of 5 is assigned, while only a single flag match achieves a weight of only 2.5 and no matches in the flags leads to a weight of 0 for this criterion of computing best match.

The present invention is capable of successfully isolating the audio frame that best matches a given test frame. By taking into account inherent properties of audio signals (i.e., the rhythm), the present invention is able to determine the best pattern match for an audio frame through very simple methods that are not computationally intensive. Results of pattern matching on frame 150 for the Brahms piano piece discussed above are shown below in TABLE II:

TABLE II

| Frame No. | % Diff | Energy Diff Weight | Local Char. Weight | Total |
|---|---|---|---|---|
| 507 | 40.8 | 2.96 | 5 | 7.960 |
| 1128 | 12.2 | 4.375 | 5 | 0.375 |
| 1212 | 71.3 | 1.435 | 5 | 6.435 |

The local energy characteristics of the frames isolated as probable matches are weighted to compute the final score out of a maximum of 10. As shown, frame 1128 is representative of the best match.

The algorithm of the present invention may be further altered to take energy variations (e.g., sections in the signal where beats are more emphasized or local trends in the energy variations) into account during computation of the best match. However, this would lead to higher computations. On the other hand, computations may be reduced by reducing the number of neighboring frames considered in computation of the percentage difference in energies in the final stage of the algorithm, but with reduced accuracy in the algorithm.

A higher match accuracy might be achieved by the algorithm by reducing the number of samples in a frame or by taking into account both the local maximum preceding and succeeding the test frame for better resolution of the pattern being searched. In addition, overlap-add techniques lead to a higher resolution in time and therefore a higher accuracy. Each of these techniques would increase the computational complexity of the algorithm.

The exemplary embodiment identifies possible input frame sequence matches to a test frame sequence based on correspondence of local maximum energy level and percent difference of overall energy level for the entire sequence. In general application, candidate input frame sequences selected for comparison of overall energy level should match the test frame sequence with respect to location of the local maximum energy. For example, if a fifty frame test sequence has a local maximum energy at frame 17, the portion of the input frame sequence that should be selected for comparison of overall energy based on a frame having an energy magnitude close to the test frame sequence local maximum energy magnitude should include the frame identified as having a close energy magnitude, sixteen frames preceding that frame, and thirty-three frames succeeding that frame.

Since the algorithm of the present invention is based only on energy computations and control codes, the algorithm is computationally more efficient to techniques for pattern recognition based on probability computation, making the present invention ideal for applications where low power is critical and real time issues are of concern (e.g., error reconstruction over wireless channels). Higher numbers of computations and criteria matching required to match the missing frame of audio would lead to a delay and thus the present invention is well-suited for real-time applications.

The present invention may be used to search for a particular song (e.g., for use as a ring tone) in a database of songs whose energy levels have been pre-computed and stored. The user could hum the tune of the desired song and the short term energy pattern could be employed to search for the desired section in all songs on the music server, with best case matches presented to the user through mobile agent technology.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A pattern recognition system comprising:
a controller having at least one input receiving a test frame sequence and a plurality of signal frames to be searched for matches to the test frame sequence, wherein the controller:
identifies as potential matches each sequence of frames within the plurality of signal frames having a frame with an energy magnitude that is within a predetermined difference of a local maximum energy magnitude for frames within the test frame sequence;
compares total energy for each potential match frame sequence to total energy of the test frame sequence; and
selects matches based on a weighted combination of (a) a difference between an energy magnitude for a frame within the test frame sequence and an energy magnitude for a frame within each sequence of signal frames, and (b) a difference between total energy of the test frame sequence and total energy of each sequence of signal frames,
wherein each potential match frame sequence includes a number of frames equal to a number of frames within the test frame sequence, and wherein a location within the respective potential match frame sequence of the frame with energy magnitude within the predetermined difference of the local maximum energy magnitude corresponds to a location within the test frame sequence of a frame having the local maximum energy magnitude.

2. The system according to claim 1, wherein the controller compares local signal characteristics for a selected frame within a potential match frame sequence to corresponding signal characteristics for a counterpart frame within the test frame sequence, the controller identifying a best match based at least in part on matching of the local signal characteristics to the corresponding signal characteristics.

3. The system according to claim 2, wherein the local signal characteristics are flags indicating whether energy is increasing or decreasing within frames including the selected frame.

4. The system according to claim 1, wherein the controller identifies a best match based at least in part on a lowest percentage difference between total energy for each potential match frame sequence and total energy of the test frame sequence.

5. The system according to claim 1, wherein the test frame sequence and the plurality of signal frames each contain audio data.

6. The system according to claim 1, wherein matching of the test frame sequence and to frame sequences within the plurality of signal frames is employed to identify beats within audio data.

7. A pattern recognition system comprising:
a controller having at least one input receiving a test frame sequence and a plurality of signal frames to be searched for matches to the test frame sequence, wherein the controller:
identifies as potential matches each sequence of frames within the plurality of signal frames having a frame with an energy magnitude that is within a predetermined difference of a local maximum energy magnitude for frames within the test frame sequence;
compares total energy for each potential match frame sequence to total energy of the test frame sequence; and
selects matches based on a weighted combination of (a) a difference between an energy magnitude for a frame within the test frame sequence and an energy magnitude for a frame within each sequence of signal frames, and (b) a difference between total energy of the test frame sequence and total energy of each sequence of signal frames, wherein the controller eliminates potential match frame sequences for which the frame with energy magnitude within the predetermined difference of the local maximum energy magnitude does not contain a local energy maximum within adjacent frames.

8. A method of pattern recognition comprising:

receiving a test frame sequence and a plurality of signal frames to be searched for matches to the test frame sequence;

identifying as potential matches each sequence of frames within the plurality of signal frames having a frame with an energy magnitude that is within a predetermined difference of a local maximum energy magnitude for frames within the test frame sequence;

comparing total energy for each potential match frame sequence to total energy of the test frame sequence; and selecting matches based on a weighted combination of (a) a difference between an energy magnitude for a frame within the test frame sequence and an energy magnitude for a frame within each sequence of signal frames, and (b) a difference between total energy of the test frame sequence and total energy of each sequence of signal frames, wherein each potential match frame sequence includes a number of frames equal to a number of frames within the test frame sequence, and wherein a location within the respective potential match frame sequence of the frame with energy magnitude within the predetermined difference of the local maximum energy magnitude corresponds to a location within the test frame sequence of a frame having the local maximum energy magnitude.

9. The method according to claim 8, further comprising:

comparing local signal characteristics for a selected frame within a potential match frame sequence to corresponding signal characteristics for a counterpart frame within the test frame sequence; and identifying a best match based at least in part on matching of the local signal characteristics to the corresponding signal characteristics.

10. The method according to claim 9, wherein the local signal characteristics are flags indicating whether energy is increasing or decreasing within frames including the selected frame.

11. The method according to claim 8, further comprising:

identifying a best match based at least in part on a lowest percentage difference between total energy for each potential match frame sequence and total energy of the test frame sequence.

12. The method according to claim 8, wherein the test frame sequence and the plurality of signal frames each contain audio data.

13. The method according to claim 8, wherein matching of the test frame sequence and to frame sequences within the plurality of signal frames is employed to identify beats within audio data.

14. A method of pattern recognition comprising:

receiving a test frame sequence and a plurality of signal frames to be searched for matches to the test frame sequence;

identifying as potential matches each sequence of frames within the plurality of signal frames having a frame with an energy magnitude that is within a predetermined difference of a local maximum energy magnitude for frames within the test frame sequence;

comparing total energy for each potential match frame sequence to total energy of the test frame sequence; and selecting matches based on a weighted combination of (a) a difference between an energy magnitude for a frame within the test frame sequence and an energy magnitude for a frame within each sequence of signal frames, and (b) a difference between total energy of the test frame sequence and total energy of each sequence of signal frames, eliminating potential match frame sequences for which the frame with energy magnitude within the predetermined difference of the local maximum energy magnitude does not contain a local energy maximum within adjacent frames.

15. An audio pattern recognition system comprising:

an input for receiving one or more of a frame sequence containing target audio data and a plurality of audio data frames to be searched for matches to the target audio data; and a controller identifying frames within the plurality of audio data frames having an energy magnitude within a predetermined difference of a local maximum energy magnitude for frames within the frame sequence, the controller identifying any frames having energy magnitude within the predetermined difference of the local maximum energy magnitude for which the energy magnitude is not a local maximum among adjacent frames, the controller comparing total energy for each set of frames corresponding to the frame sequence and including a frame having energy magnitude within the predetermined difference of the local maximum energy magnitude that is also a local maximum among adjacent frames to total energy for the frame sequence, and the controller selecting matches to the target audio data based on a weighted combination of differences in energy magnitudes for individual frames and differences in total energy for groups of frames.

16. The system according to claim 15, wherein the controller identifies a best match between audio data within the plurality of audio data frames to the target audio data based at least in part on a lowest percentage difference between total energy for a set of frames from the plurality of audio data frames and total energy of the frame sequence.

17. The system according to claim 15, wherein the controller compares local signal characteristics for a selected frame within a set of frames to counterpart signal characteristics within the frame sequence, the controller identifying between audio data within the plurality of audio data frames to the target audio data based at least in part on matching of the local signal characteristics to the counterpart signal characteristics.

18. The system according to claim 15, wherein the local signal characteristics and the counterpart signal characteristics are indications of an energy increase, and energy decrease, an energy peak or an energy nadir across a group of successive frames.

* * * * *